July 17, 1956 T. F. SARAH 2,755,037
SPOOL CONSTRUCTION FOR SPINNING REEL
Filed March 1, 1954 2 Sheets-Sheet 1
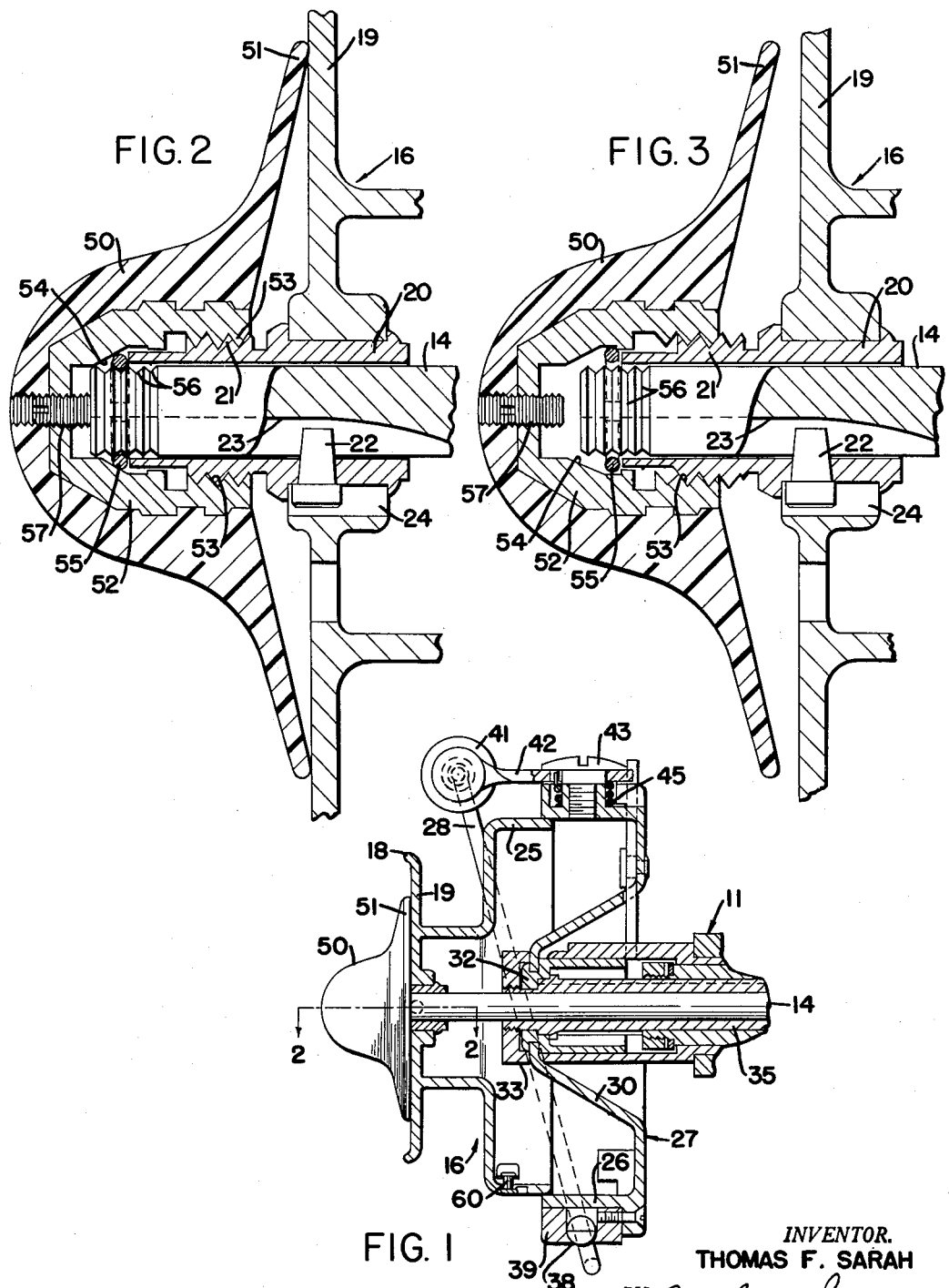
INVENTOR.
THOMAS F. SARAH
BY Ely, Fryer & Hamilton
ATTORNEYS INVENTOR.
THOMAS F. SARAH
BY Ely, Frye & Hamilton
ATTORNEYS

United States Patent Office 2,755,037
Patented July 17, 1956

2,755,037

SPOOL CONSTRUCTION FOR SPINNING REEL

Thomas F. Sarah, Akron, Ohio, assignor to The Enterprise Manufacturing Company, Akron, Ohio, a corporation of Ohio Application March 1, 1954, Serial No. 412,988

8 Claims. (Cl. 242—130)

The invention relates generally to spinning reels used in fishing, and more particularly to improvements in the spool on which the fishing line is wound.

In using spinning reels, it is highly desirable to employ several spools having lines of different weight wound thereon, and to change spools to suit different conditions. The reel should be constructed so that the spools can be changed quickly and easily. When a spool is being changed or is not in use, provision should be made to prevent the line from unwinding from the spool, especially since the nylon type of line which is currently popular has added resiliency which increases its tendency to unwind.

In certain prior spinning reels the spool is screwed on the spool shaft and held in place by means of a lock washer and a nut screwed on the outer end of the shaft. It is desirable to screw the spool on the shaft so that it is adjustable relative to the roller guiding the line onto the spool. Thus, when the nut and lock washer are removed to remove the spool there are two loose pieces to handle in addition to the spool, and the pieces are apt to be dropped and become lost. Moreover, it requires a substantial amount of time to remove the nut and washer, unscrew the spool, screw a new spool to proper position on the shaft, and then replace the nut and washer.

Prior devices for holding the line from unwinding have been inconvenient and awkward to use, and cause undue wear on the line.

It is an object of the present invention to provide a novel and improved spool construction which has no loose parts to be removed when changing spools.

Another object is to provide a novel spool construction which can be removed and replaced in a minimum of time.

A further object is to provide a novel removable spool construction which is easily adjustable on the spool shaft to cooperate with the line guiding roller, and which will automatically return to the same adjusted position when replaced.

These and other objects are accomplished by the improvements comprising the present invention, a preferred embodiment of which is illustrated by way of example in the accompanying drawing and described in detail in the following specification. Various modifications and changes in details of construction are intended to be within the scope of the invention as defined in the appended claims.

Referring to the drawings:

Fig. 1 is a fragmentary sectional view of a spinning reel embodying the improved spool construction;

Fig. 2 is an enlarged fragmentary sectional view showing the spool held on the shaft by a novel quick release nut;

Fig. 3 is a similar view with the nut in released position;

Figure 4:
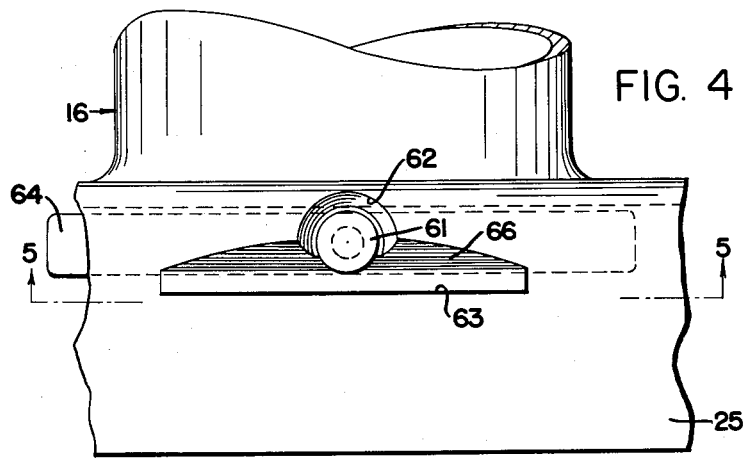
Fig. 4 is an enlarged fragmentary elevation looking toward the rim of the spool.
Figure 5:
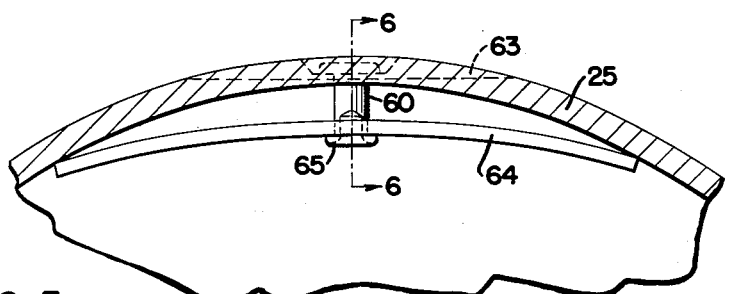
Fig. 5 is a sectional view on line 5—5, Figs. 4 and 6.

The type of reel shown in Fig. 1 is disclosed in my copending application Serial No. 371,385, filed July 30, 1953, and entitled Spinning Reel, now U. S. Patent No. 2,713,463. As disclosed in said application, the reel has a spool shaft 14 which carries the spool 16 having an inner skirt flange 25 which is telescopically received within the outer annular flange 26 of a carrier or flyer 27 which carries the pick-up arm or bale 28. The carrier 27 preferably has a re-entrant conical base 30 which is seated in a bushing 32, and the bushing is secured by a nut 33 on the front end of a tubular drive shaft 35 which is rotatable and slidable on spool shaft 14.

The reel housing shown fragmentarily at 11 is also carried on the spool shaft 14, and suitable means (not shown) are provided in the reel housing for driving the tubular shaft 35 to rotate the carrier 27.

Means are also provided to reciprocate the carrier as it rotates to level wind the line on the spool. The carrier mounts the pick-up arm or loop 28, one end of which has a ball joint 38 universally mounted in a socket member 39 on the carrier. The other end of loop 28 is connected to a line guide bracket 41 mounted on a pivot arm 42 journaled on the shank of a pivot screw 43 around which is mounted a torsion spring 45 urging the arm 28 to its line guiding position shown in Fig. 1. The bracket 41 is preferably provided with a suitable roller over which the line passes to the spool.

In the casting position the arm 28 is swung through 180° to an out-of-the-way position, so that as the line is cast the line peels off the stationary spool over the curved lip 18 of its front flange 19, and when the crank handle of the reel is turned to wind in the line, the spring 45 snaps the arm 28 to the position of Fig. 1 where it engages the incoming line and guides it onto the roller in the line guide bracket 41.

The front flange 19 of the spool is preferably mounted at its central portion on a hub bushing 20 which extends forwardly around the shaft 14 and has an external threaded portion 21 between its outer end and the spool flange 19. A pin 22 keys or splines the spool to the shaft, the shank of the pin extending into a keyway 23 in shaft 14 and the head of the pin extending into a slot 24 in the hub of the spool.

A quick release nut 50 is provided for securing the spool on shaft 14 in adjusted position relative to the line guide bracket 41. The nut 50 is preferably made of a plastic material and has a skirt flange 51 which resiliently engages the front flange 19 of the spool, as shown in Fig. 1. Preferably, the nut 50 has a metal insert bushing 52 molded therein which has an internal thread 53 screwed on the portion 21 of bushing 20. The insert bushing 52 is cup-shaped and its base has a tapered annular surface 54 normally positioned at the outer end of bushing 21.

A split snap ring 55 is located within the surface 54 and has a diameter such that when released the ring will occupy the annular space within the insert bushing 52 at the large end of the surface 54, in which position the ring does not engage the spool shaft 14, as shown in Fig. 3. When the nut 50 is screwed inwardly on the bushing 20, the tapered surface 54 abuts and compresses the ring 55 to cause it to engage the shaft 14. A series of annular grooves 56 is provided on the end of the shaft to retain the ring selectively in several positions along the shaft, and a set screw 57 screwed through the end of the nut and bushing 52 abuts the end of the shaft to return the spool to the same adjusted position relative to the line guide bracket 41.

When the spool 16 is mounted on the shaft 14 as shown in Fig. 1, the nut 50 is screwed on the bushing 20 with the skirt flange 51 resiliently engaging the front flange 19 and the tapered surface 54 compressing the ring 55 into engagement with one of the grooves 56, so that withdrawal of the spool is prevented by engagement of the end of bushing 20 with the ring. The set screw is screwed in to abut the end of shaft 14. When it is desired to remove the spool one full turn of the nut allows the ring 55 to expand into the annular space at the large end of the tapered surface 54, as shown in Fig. 3, and the spool with nut 50 still attached to bushing 20 can be removed bodily from the shaft.

To replace the spool 16 it is only necessary to enter the shank of pin 22 into the keyway 23 in shaft 14 and slide the bushing 20 and the nut 50 affixed thereto over the shaft until the spool reaches the desired position, whereupon one full turn of the nut 50 will compress the ring into a groove 56, and bring the set screw into abutment with the end of shaft 14 to again locate the spool in the same position relative to the line guide bracket 41. To adjust the position of the spool on the shaft, the set screw 57 is partly unscrewed and the nut 50 unscrewed one turn, whereupon the spool can be moved along the shaft to position the ring over a different groove, the nut tightened and the set screw adjusted to its new position.

Accordingly, a fisherman may carry several spools, each with a different weight line, for his spinning reel, and each spool will include a quick release nut 50 which has been previously adjusted by adjusting the set screw 57 to locate the spool in proper position on the shaft to effect accurate level winding of the line on the spool. Thus, the several spools can be quickly removed and replaced merely by turning the nut one full turn and each spool will always be locked in the same relative position on the shaft. Since the nut always remains with its spool, there are no loose parts to become lost.

Figure 6:
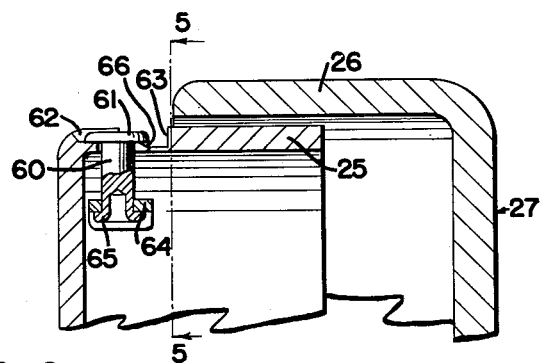
Fig. 6 is a sectional view on line 6—6, Fig. 5.

The novel line fastening device is applied to the inner skirt flange 25 of the spool, and preferably near the inner side of said flange so that it is exposed at all times except when the skirt flange is completely telescoped within the carrier 27 at one end of the reciprocatory stroke of the carrier, which produces the level winding of the line on the spool. As indicated in Fig. 6, the line fastening device includes a rivet 60 slidably mounted in the flange 25, and if the rivet should be covered by the flange 26 of the carrier, a slight turn on the crank handle of the reel will retract the carrier and expose the head 61 of the rivet.

The head 61 of the rivet is seated in a recess 62 in the flange 25, and the recess merges with a slot 63 extending along the inner side of the rivet substantially tangent to the inner circumference of the flange 25.

The rivet head is yieldingly urged against the bottom of the recess by a flat spring 64 engaged behind the upset flange 65 on the inner end of the rivet 60. Preferably, the spring extends substantially parallel to the slot 63, and its ends resiliently engage the inner circumference of the skirt flange 25.

The bottom surface of the slot 63 is below the bottom surface of the recess 62 and the two surfaces are connected by an inclined surface 66. Thus, when the head 61 of the rivet is seated on the bottom of the recess 62 by the spring, as indicated in Fig. 6, the fishing line can be easily laid in the slot 63 and then drawn upwardly over the inclined surface to engage the line under the rivet head, and prevent the line from unwinding. The tension of spring 64 is such that a lateral pull on the line will release it from the head 61.

It will be seen that the novel line fastening device is adapted for quickly fastening the end of the line which is wound on the spool, to hold the line while the spool is removed from the reel, or when the reel is removed from the rod, or at any time when it is desired to prevent the line from unwinding from the spool. Fastening the line does not require detaching the spool and does not chafe or cut the line.

What is claimed is:

1. A spool construction for a fishing reel, including a spool shaft, a front spool flange splined on the shaft and slidable longitudinally thereof, said spool having a tubular, externally threaded hub member extending forwardly around the end of said shaft, the end of said shaft having at least one peripheral groove, a quick release nut screwed on said member and having a tapered socket, and a split spring ring in said socket abutting the end of said tubular member and adapted to be contracted by said socket into engagement with said peripheral groove when the nut is tightened on said tubular member.

2. A spool construction for a fishing reel, including a spool shaft, a front spool flange splined on the shaft and slidable longitudinally thereof, said spool having a tubular, externally threaded hub member extending forwardly around the end of said shaft, the end of said shaft having at least one peripheral groove, a quick release nut screwed on said member and having a tapered socket, and a split spring ring in said socket abutting the end of said tubular member and normally contracted by said tapered socket into engagement with said peripheral groove, said ring being released from said groove by one turn of the nut on said tubular member.

3. A spool construction for a fishing reel, comprising a spool shaft, a front spool flange splined on the shaft and removable longitudinally therefrom, said spool having a tubular externally threaded member extending forwardly around said shaft, the end of the shaft normally projecting beyond the tubular member and having at least one peripheral groove, a quick release nut screwed on said tubular member and having a tapered socket surrounding the projecting end of said shaft, and a split spring ring in said socket abutting the end of said tubular member and contractible by one turn of said socket into said groove.

4. A spool construction for a fishing reel, including a spool shaft, a front spool flange splined on the shaft and slidable longitudinally thereof, said spool having a tubular, externally threaded hub member extending forwardly around the end of said shaft, the end of said shaft having at least one peripheral groove, a quick release nut screwed on said member and having a tapered socket, a split spring ring in said socket abutting the end of said tubular member and adapted to be contracted by said socket into engagement with said peripheral groove when the nut is tightened on said tubular member, and a set screw in the end of said nut for abutting the end of said shaft to adjust the position of the spool on the shaft.

5. A spool construction for a fishing reel, including a spool shaft, a front spool flange splined on the shaft and slidable longitudinally thereof, said spool having a tubular, externally threaded hub member extending forwardly around the end of said shaft, the end of said shaft having at least one peripheral groove, a quick release nut screwed on said member and having a tapered socket, a split spring ring in said socket abutting the end of said tubular member and normally contracted by said tapered socket into engagement with said peripheral groove, said ring being released from said groove by one turn of the nut on said tubular member, and a set screw in the end of said nut for abutting the end of said shaft to adjust the position of the spool on the shaft.

6. A spool construction for a fishing reel, comprising a spool shaft, a front spool flange splined on the shaft and removable longitudinally therefrom, said spool having a tubular externally threaded member extending forwardly around said shaft, the end of the shaft normally projecting beyond the tubular member and having at least one peripheral groove, a quick release nut screwed on said tubular member and having a tapered socket surrounding the projecting end of said shaft, a split spring ring in said socket abutting the end of said tubular member and contractible by one turn of said socket into said groove, and a set screw in the end of said nut for abutting the end of said shaft to adjust the position of the spool on the shaft.

7. A spool construction for a fishing reel comprising a hub, a front flange on the hub, a bushing in the hub, a spool shaft splined in the bushing and projecting forwardly of the bushing, the end of the shaft having a peripheral groove, a quick release nut screwed on the bushing and having a tapered socket surrounding said peripheral groove, and a spring ring in said socket abutting said bushing and contractible into said groove by abutment with said socket.

8. A spool construction for a fishing reel comprising a hub, a front flange on the hub, a bushing in the hub, a spool shaft splined in the bushing and projecting forwardly of the bushing, the end of the shaft having a series of peripheral grooves, a quick release nut screwed on the bushing and having a tapered socket wall surrounding the projecting end of said shaft, a spring ring in said socket abutting said bushing normally contracted by said socket wall into engagement with one of said grooves, said ring being releasable by one turn of the nut, and a set screw in the end of the nut for abutting the end of said shaft to adjust the position of the spool on the shaft.

References Cited in the file of this patent

UNITED STATES PATENTS

| | | |
|---|---|---|
| 1,859,842 | Radford | May 24, 1932 |
| 2,142,582 | Wright | Jan. 3, 1939 |
| 2,532,541 | Dale | Dec. 5, 1950 |
| 2,536,126 | Dale | Jan. 2, 1951 |

FOREIGN PATENTS

| | | |
|---|---|---|
| 961,023 | France | Nov. 14, 1949 |
| 995,415 | France | Aug. 22, 1951 |